United States Patent [19]
Ezaki et al.

[11] Patent Number: 4,918,556
[45] Date of Patent: Apr. 17, 1990

[54] MAGNETIC DISK RECORDING AND REPRODUCING APPARATUS

[75] Inventors: Joichiro Ezaki, Saku; Kazumasa Fukuda, Komoro; Masanori Sakai, Nagano, all of Japan

[73] Assignee: TDK Corporation, Tokyo, Japan

[21] Appl. No.: 233,129

[22] Filed: Aug. 17, 1988

[30] Foreign Application Priority Data

Aug. 27, 1987 [JP] Japan .................................. 62-213287

[51] Int. Cl.[4] ............................................. G11B 5/012
[52] U.S. Cl. .................................. 360/97.02; 360/103
[58] Field of Search ........................... 360/97.01–97.04, 360/103, 105, 106

[56] References Cited

U.S. PATENT DOCUMENTS

4,605,977 8/1986 Matthews ............................ 360/103
4,853,810 8/1989 Pohl ..................................... 360/103

Primary Examiner—A. J. Heinz
Attorney, Agent, or Firm—Oblon, Spivak, McClelland, Maier & Neustadt

[57] ABSTRACT

A magnetic recording and reproducing apparatus of a type wherein a magnetic disk having a magnetic recording layer formed on a rigid substrate is rotatable at a high speed and a magnetic head is disposed on the surface of the disk so that magnetic recording and reproduction are conducted by the head while rotating the disk at a high speed, wherein the surface roughness $R_{max}$ of the magnetic disk is adjusted at a level of at most 100 Å, and the flying height of the magnetic head at the initiation of flying is adjusted at a level within a range of from 0.01 to 0.04 µm.

14 Claims, 7 Drawing Sheets

MAGNETIC DISK RECORDING AND REPRODUCING APPARATUS

BACKGROUND OF THE INVENTION

1. Field of the Invention

The present invention relates to a magnetic recording and reproducing apparatus of a type wherein a magnetic disk having a magnetic recording layer formed on a rigid substrate is rotatable at a high speed and a magnetic head is disposed on the surface of the disk so that magnetic recording and reproduction are conducted by the head while rotating the disk at a high speed.

2. Discussion of Background

As is well known, in a magnetic recording and reproducing apparatus of this type, a hard magnetic disk comprising a rigid substrate made of aluminum and a thin magnetic layer formed thereon by a method such as a fine magnetic powder coating method, a plating method or a sputtering method, is rotated at a high speed (e.g. 3600 rpm) so as to produce a dynamic pressure between the magnetic disk and a flying magnetic head so that the magnetic head is lifted and floats with a certain flying height by a fine air bearing, while the magnetic recording and reading are conducted.

In order to accomplish high density magnetic recording with a magnetic recording and reproducing apparatus of this type, it is necessary to minimize the flying height of the magnetic head and to reduce the spacing loss. However, if the flying height is lowered to reduce the spacing loss, it tends to be more likely that the magnetic head is susceptible to the influence of the surface condition of the magnetic disk or of the vibration during the high speed rotation and impinges on the surface of the magnetic disk, whereby there will be a problem such as a damage to the magnetic disk or a head crush and the durability tends to be low. To avoid such a problem, it has been common to set the flying height of the magnetic head at a level of from 0.1 to 0.3 μm to secure the durability. Thus, there has been a limitation in the reduction of the spacing loss and accordingly in the improvement for high density magnetic recording.

SUMMARY OF THE INVENTION

Under the circumstances, it is an object of the present invention to overcome the above-mentioned problem inherent to the conventional technique and to reduce the spacing loss to realize high density recording and at the same time improve the durability of the magnetic disk and the magnetic head.

The present invention provides a magnetic recording and reproducing apparatus of a type wherein a magnetic disk having a magnetic recording layer formed on a rigid substrate is rotatable at a high speed and a magnetic head is disposed on the surface of the disk so that magnetic recording and reproduction are conducted by the head while rotating the disk at a high speed, wherein the surface roughness $R_{max}$ of the magnetic disk is adjusted at a level of at most 100 Å, and the flying height of the magnetic head at the initiation of flying is adjusted at a level within a range of from 0.01 to 0.04 μm.

DETAILED DESCRIPTION OF THE PREFERRED EMBODIMENTS

In the present invention, the flying height of the magnetic head at the initiation of flying is meant for the minimum flying height where the magnetic head is out of contact with the surface of the magnetic disk when the magnetic disk is rotated at a high speed.

By adjusting the surface roughness $R_{max}$ of the magnetic disk to a level of at most 100 Å and the flying height of the magnetic head at the initiation of flying to a level within a range of from 0.01 to 0.04 μm, it is possible to avoid a contact of the magnetic head with the surface of the magnetic disk during the high speed rotation for the magnetic recording and reproduction in a very low flying height region, and it is thereby possible to improve the durability.

The flying height of the magnetic head is usually at a level of from 2 to 3 times the flying height at the initiation of flying of from 0.01 to 0.04 μm, whereby the spacing loss can substantially be reduced as compared with the conventional technique, and high density recording can be made possible.

Figure 1:
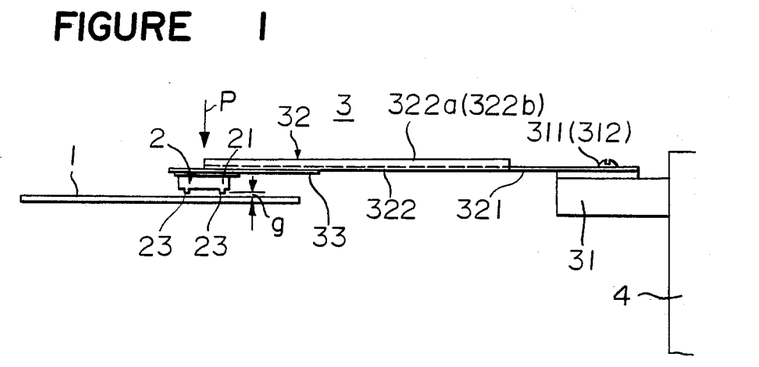
FIG. 1 is a front view of a magnetic recording and reproducing apparatus of the present invention.
Figure 2:
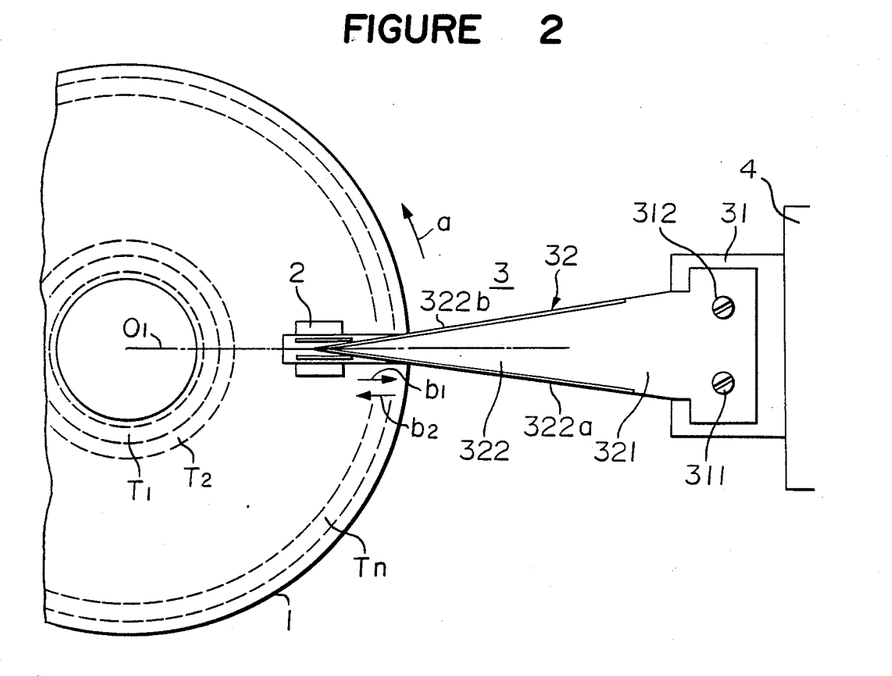
FIG. 2 is a plan view thereof.

FIG. 1 is a front view of a magnetic recording and reproducing apparatus of the present invention, and FIG. 2 is a plan view thereof. In the drawings, reference numeral 1 indicates a magnetic disk, numeral 2 indicates a magnetic head, numeral 3 indicates a ginbal supporting device, and numeral 4 indicates a positioning device. The magnetic disk 1 is rotationally driven in the direction of an arrow a by a rotational drive mechanism (not shown). The magnetic head 2 is supported by the supporting device 3 and driven by the positioning apparatus 4 in the direction of an arrow $b_1$ or $b_2$ along the rotational diameter $O_1$ for positioning, whereby the magnetic recording or reproduction is conducted at a predetermined cylinder among $T_l$ to $T_n$.

Figure 3:
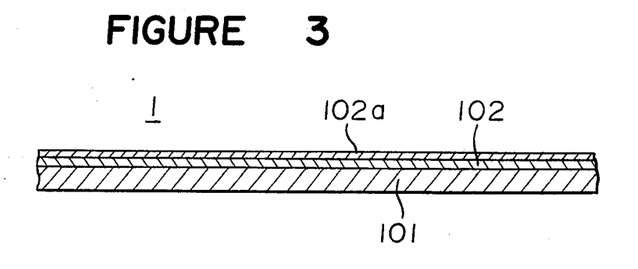
FIG. 3 is an enlarged cross-sectional view of a part of a magnetic disk constituting a magnetic recording and reproducing apparatus of the present invention.
Figure 4:
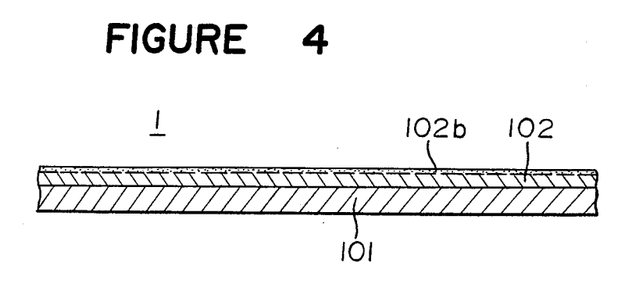
FIG. 4 is also an enlarged cross-sectional view of a part of a magnetic disk according to another example.

The magnetic disk 1 is a medium having good surface properties with a surface roughness $R_{max}$ of at most 100 Å, preferably at most 50 Å. As shown in FIG. 3, the magnetic disk 1 comprises a rigid substrate 101 and a magnetic recording layer 102 formed on the surface of the substrate by a vacuum depositing method. The magnetic recording layer 102 is formed as a thin magnetic layer of e.g. $\gamma\text{-}Fe_2O_3$ or Co-Ni or Co-Cr. The thickness of the magnetic recording layer 102 formed by the vacuum depositing method is at most about 0.5 μm, and therefore the surface properties of the rigid substrate 101 is reflected as the surface properties in the recording layer 102. Accordingly, as the rigid substrate 102, the one having a surface roughness $R_{max}$ of at most 100 Å is employed. As specific examples of such a rigid substrate, rigid substrates composed essentially of glass, chemically reinforced soda alumino silicate glass or ceramics are suitable. The magnetic recording layer 102 may be constituted by a magnetic iron oxide such as $\gamma$-$Fe_2O_3$ or a magnetic nitride. Further, when the magnetic layer is made of a metal or alloy, it is advisable to form an oxide layer or a nitride layer 102a on its surface as shown in FIG. 3, or it is advisable to convert the surface into an oxidized coating film 102b. Thus, the durability of the magnetic recording layer 102 can be improved, and it is possible to prevent a damage to the magnetic disk 1 even when the recording or reproduction is conducted at a very low flying height or even at the time of the contact start and stop. The oxide layer or the nitride layer 102a can be formed by reactive sputtering or by reactive vapor deposition. The oxidized coating film 102b may be formed by intentionally oxidizing the surface of the magnetic recording layer 102 made of a metal or alloy containing at least one member of iron, cobalt and nickel, such as Co-Ni or Co-Cr, by e.g. reactive plasma treatment. The magnetic disk 1 may be of a vertical recording type wherein the recording residual magnetization is composed essentially of a component perpendicular to the recording layer or of an in-plane recording type wherein the recording residual magnetization is composed essentially of a component in the same plane as the recording layer. A lubricant may be coated on the surface of the magnetic recording layer 102 although such an embodiment is not shown in the drawings.

Figure 5:
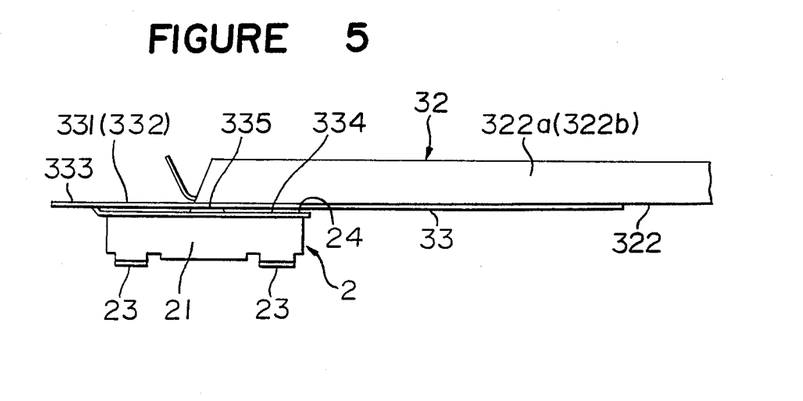
FIGS. 5 and 6 are views illustrating the assembly structure between a magnetic head and a supporting device.
Figure 6:
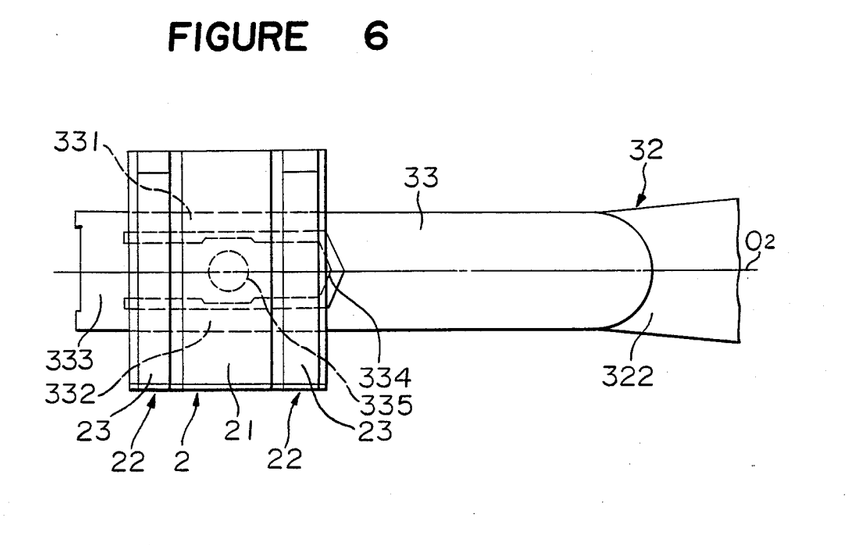

FIGS. 5 and 6 illustrate the assembly structure of the magnetic head 2 and the supporting device 3. The magnetic head 2 is provided with a reading and writing element 22 at the air discharge end of the slider 21 which is a ceramic structure and is supported for a pitching motion and a rolling motion by exerting a load to the surface 24 opposite to the flying surface 23 by the supporting device 3 driven by the positioning device 4. The reading and writing element 22 is a thin layer element formed by a process similar to the technology for the production of an integrated circuit.

The supporting device 3 comprises a supporter 32 made of a resilient thin metal plate, one end of which is secured by fastening means 311 and 312 to a rigid arm 31, which is attached to the positioning apparatus 4. At the free end in the longitudinal direction of the supporter 32, a flexible member 33 made of the same thin metal plate is attached. On the lower surface of this flexible member 33, a magnetic head 2 is attached (FIGS. 1 and 2). The supporter 32 has a resilient spring portion 321 which is attached to the rigid arm 31. A rigid beam portion 322 is formed continuously from this resilient spring portion 321. The rigid beam portion 322 has flanges 322a and 322b formed by bending the beam portion along both sides. The flexible member 33 comprises two flexible outer frame portions 331 and 332 extending substantially in parallel with the axial line in the longitudinal direction of the supporter 32, a lateral frame 303 connecting the flexible outer frame portions 331 and 332 at the end far from the supporter 32 and a central tongue portion 334 extending substantially in parallel with the flexible outer frame portions 331 and 332 from about the center of the lateral frame 333 and having its forward end as a free end. One end opposite to the end having the lateral frame 333 is connected to near the free end of the supporter 32 by means of e.g. welding.

A loading projection 335 in a semi-spherical form is provided on the upper surface of the central tongue portion 334 of the flexible member 32 so that a loading force is transmitted from the free end of the supporter 32 to the central tongue portion 334. The surface 24 of the magnetic head 2 is bonded to the lower surface of the central tongue portion 334 by means of, for instance, an adhesive.

In the present invention, the flying height of the magnetic head 2 at the initiation of flying is adjusted at a level within a range of from 0.01 to 0.04 $\mu$m by using the magnetic disk 1 having the above specified surface roughness $R_{max}$. Then, the magnetic disk is driven while the flying height g of the magnetic head 2 at the innermost cylinder $T_n$ among the reading and writing cylinders $T_1$ to $T_n$ formed on the magnetic disk 1 is adjusted at a level between the flying height at the initiation of flying of from 0.01 to 0.04 $\mu$m to a few times thereof. The shape of the slider 21 constituting the magnetic head 2, the load exerted to the magnetic head 2 from the supporting device 3, the rotational speed of the magnetic disk 1, etc. are adjusted to obtain the above-mentioned flying heights.

Figure 7:
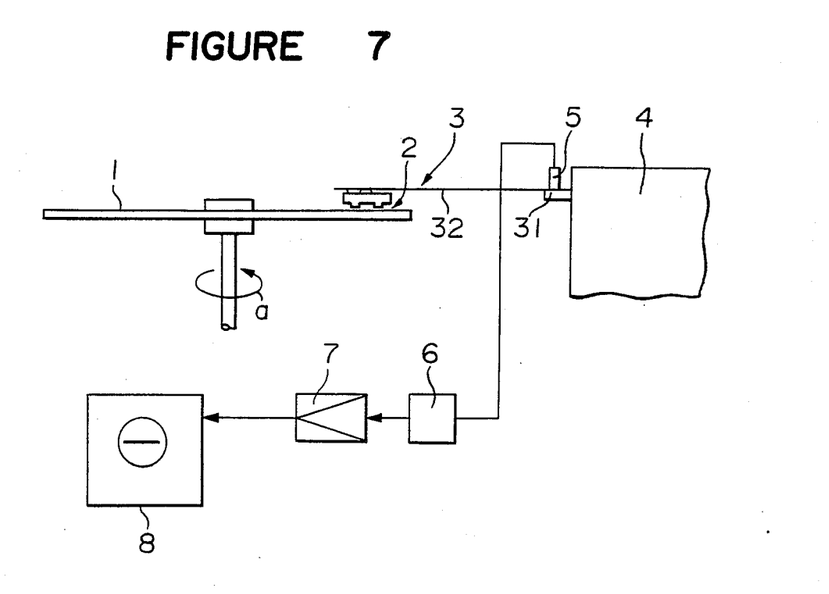
FIG. 7 is a view illustrating a system for measuring the flying height at the initiation of flying.
Figure 8:
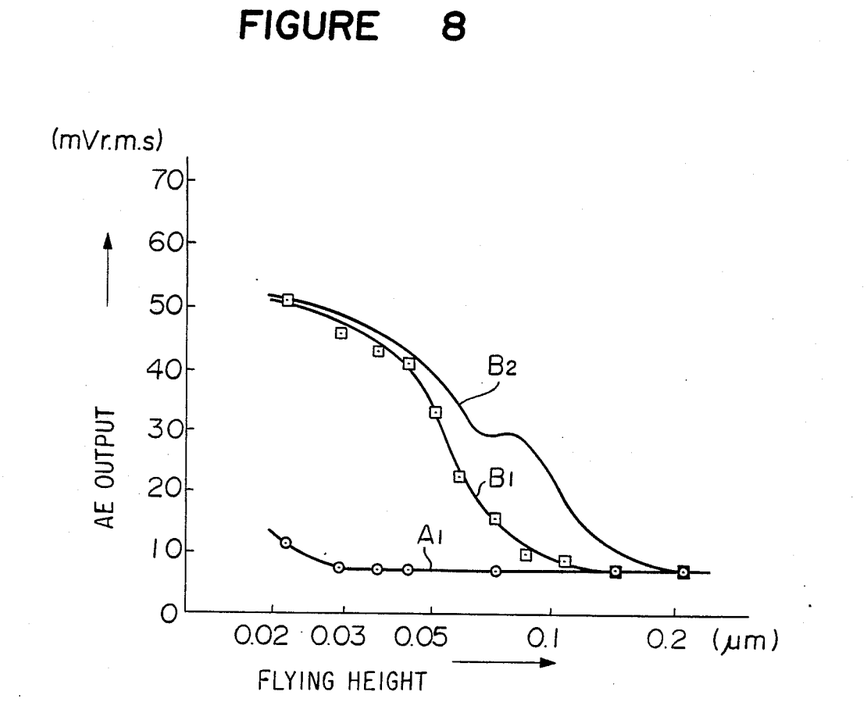
FIG. 8 is a graph showing the relation of the flying height and the AE output obtained by an AE system.

The flying height at the initiation of flying can be measured by using an acoustic emission sensor. FIG. 7 illustrates the system for the measurement, wherein reference numeral 5 indicates an acoustic emission sensor (hereinafter referred to simply as an AE sensor), numeral 6 indicates a filter, numeral 7 indicates an amplifier and numeral 8 indicates an oscilloscope. If the magnetic head 2 impinges on the surface of the magnetic disk which is rotated at a high speed, the impingement is detected by the AE sensor 5 and shown on the oscilloscope 8 in the form of an impingement wave. The minimum flying height where no such an impingement wave appears, is taken as the flying height at the initiation of flying. FIG. 8 is a graph showing the flying height-AE output relation obtained by the above-mentioned AE system. Characteristic $A_1$ is the characteristic in a case where a magnetic disk 1 having the magnetic recording layer 102 of $\gamma$-$Fe_2O_3$ formed by sputtering on the surface of a rigid substrate 101 made of glass to have a surface roughness $R_{max}$ of at most 100 Å is used; characteristic $B_1$ is the characteristic in a case where a magnetic disk 1 having a magnetic recording layer 102 of Co-Ni formed by sputtering on the surface of a rigid substrate 101 made of aluminum is used; and characteristic $B_2$ is the characteristic in a case where a magnetic disk 1 having fine particles of $\gamma$-$Fe_2O_3$ coated on the surface of a rigid substrate 101 made of aluminum. As shown in FIG. 8, the flying height at the initiation of flying is 0.03 $\mu$m when the magnetic disk 1 having the magnetic recording layer 102 of $\gamma$-$Fe_2O_3$ formed by sputtering on the surface of the rigid substrate 101 made of glass to have a surface roughness $R_{max}$ of at most 100 Å, is used. Whereas, the flying height at the initiation of flying is at a level of from 0.1 to 0.2 $\mu$m when the magnetic disk 1 having a layer of Co-Ni or fine particles of $\gamma$-$Fe_2O_3$ formed on the surface of the rigid substrate 101 made of aluminum, is used.

For the magnetic recording and reproduction, the apparatus is operated by a so-called contact start stop system. Namely, at the starting or stopping of the operation, the flying surface 23 of the slider 21 of the magnetic head 2 is in contact with the surface of the magnetic disk 1. When the magnetic disk 1 is static, the flying surface 23 is pressed against the surface of the magnetic disk 1 by the load P. When the magnetic disk 1 is rotated, a lifting dynamic pressure is exerted to the flying surface 23 of the slider 21, whereby the magnetic head floats with a flying height g where the dynamic pressure and the load P are balanced, and the magnetic recording to the magnetic disk 1 or reading out of the information recorded on the magnetic disk 1 is conducted in this state.

Here, the flying height g of the magnetic head 2 is minimum at the innermost cylinder $T_1$ of the magnetic disk 1 and gradually increases towards the peripheral direction where the relative speed is larger. Accordingly, it is possible to avoid the contact of the magnetic head 2 to the surface of the magnetic disk 1 during the high speed rotation of the disk for the magnetic recording and reproduction by adjusting the surface roughness $R_{max}$ of the magnetic disk 1 to a level of at most 100 Å and the flying height of the magnetic head 2 at the initiation of flying within a range of from 0.01 to 0.04 μm and adjusting the flying height g of the magnetic head 2 at the innermost cylinder $T_1$ of the magnetic disk 1 to a level of at least the flying height at the initiation of flying, and the durability can thereby be improved.

Figure 9:
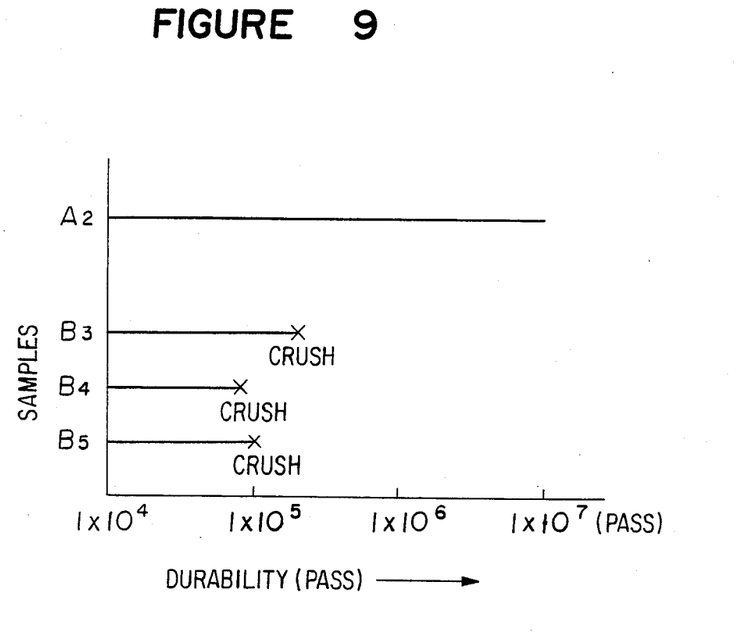
FIG. 9 shows the durability of a magnetic disk when a magnetic recording and reproducing apparatus of the present invention is used, as compared with a conventional magnetic recording and reproducing apparatus.

FIG. 9 is a graph showing the durability of the magnetic disk used in the magnetic recording and reproducing apparatus of the present invention as compared with conventional magnetic recording and reproducing apparatus. Characteristic $A_2$ represents the durability characteristic of the magnetic recording and reproducing apparatus of the present invention, and characteristics $B_3$ to $B_5$ represent the durability characteristics of the conventional magnetic recording and reproducing apparatus. Characteristic $A_2$ was obtained with the flying height of the magnetic head 2 being 0.02 μm by using a magnetic disk 1 having a magnetic recording layer 102 of $\gamma$-$Fe_2O_3$ formed by sputtering on the surface of a rigid substrate 101 made of glass to have a surface roughness $R_{max}$ of at most 100 Å. Characteristics $B_3$ to $B_5$ were obtained with the flying height of the magnetic head 2 being 0.02 μm (assumption) by using a magnetic disk 1 having a magnetic recording layer 102 of Co-Ni formed by sputtering on the surface of a rigid substrate 101 made of aluminum. As is apparent from the Figure, with the conventional magnetic recording and reproducing apparatus, head crush was observed at about $1 \times 10^5$ pass, while with the magnetic recording and reproducing apparatus of the present invention, no head crush was observed even at $1 \times 10^7$ pass, thus indicating a remarkable improvement in the durability.

Figure 10:
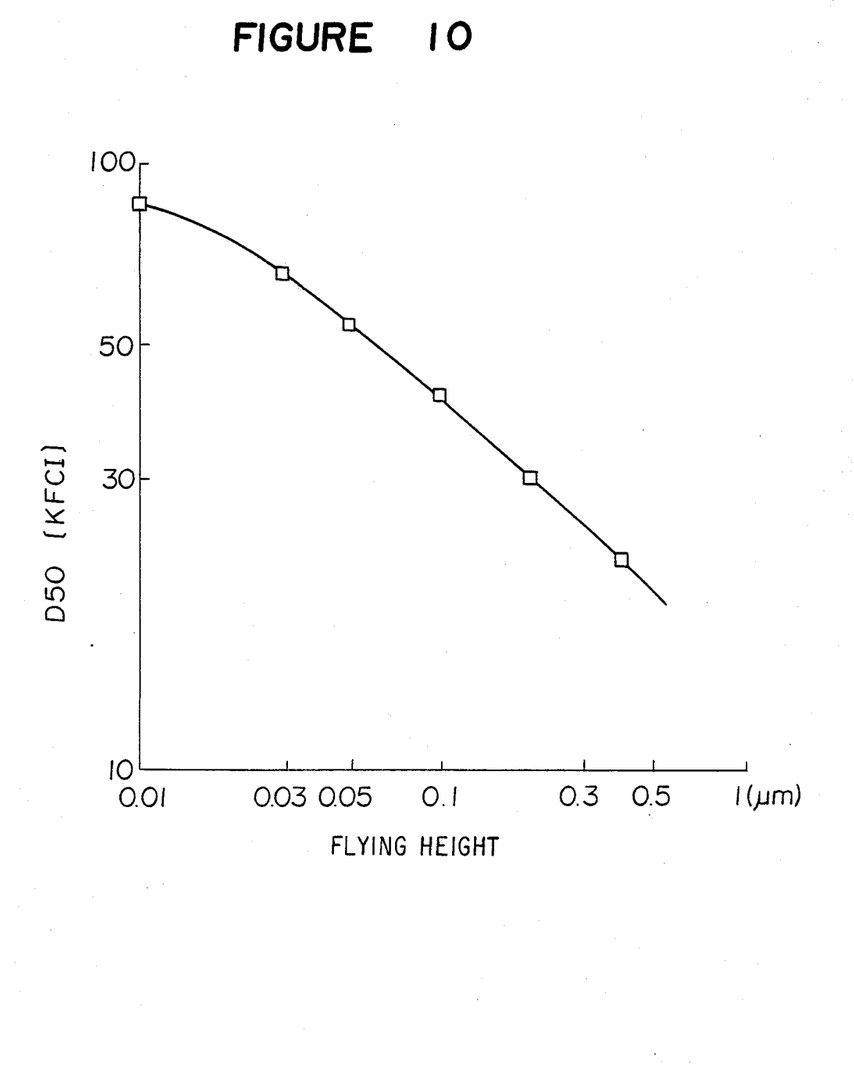
FIG. 10 is a view illustrating the relation between the flying height and the $D_{50}$ output.

Further, as shown in FIG. 10, $D_{50}$ can be at least 50 (KFCI) by adjusting the flying height at the initiation of flying to a level of from 0.01 to 0.04 μm. This is attributable to a reduction of the spacing loss, whereby high density recording is made possible.

As described in the foregoing, in the magnetic recording and reproducing apparatus of the present invention, the surface roughness $R_{max}$ of the magnetic disk is adjusted at a level of at most 100 Å and the flying height of the magnetic head at the initiation of flying is adjusted within a range of from 0.01 to 0.04 μm, whereby the spacing loss can be reduced to make high density recording possible and the durability of the magnetic disk and the magnetic head can be improved.

What is claimed is:

1. A magnetic recording and reproducing apparatus of a type wherein a magnetic disk having a magnetic recording layer formed on a rigid substrate is rotatable at a high speed and a magnetic head is disposed on the surface of the disk so that magnetic recording and reproduction are conducted by the head while rotating the disk at a high speed, wherein the surface roughness $R_{max}$ of the magnetic disk is adjusted at a level of at most 100 Å, and the flying height of the magnetic head at the initiation of flying is adjusted at a level within a range of from 0.01 to 0.04 μm.

2. The magnetic recording and reproducing apparatus according to claim 1, wherein the flying height at the initiation of flying is adjusted at a level within a range of from 0.02 to 0.03 μm.

3. The magnetic recording and reproducing apparatus according to claim 1, wherein the flying height of the magnetic head at the inner most cylinder of the magnetic disk is adjusted at a level between said flying height at the initiation of flying and a few times thereof.

4. The magnetic recording and reproducing apparatus according to claim 1, wherein said substrate has a surface roughness $R_{max}$ of at most 100 Å.

5. The magnetic recording and reproducing apparatus according to claim 1, wherein said substrate is composed essentially of glass.

6. The magnetic recording and reproducing apparatus according to claim 1, wherein said substrate is composed essentially of a chemically reinforced soda alumino silicate glass.

7. The magnetic recording and reproducing apparatus according to claim 1, wherein said substrate is made of ceramics.

8. The magnetic recording and reproducing apparatus according to claim 1, wherein the magnetic recording layer is formed by vacuum depositing.

9. The magnetic recording and reproducing apparatus according to claim 1, wherein the magnetic recording layer constitutes an oxide layer or a nitride layer at least at its surface layer.

10. The magnetic recording and reproducing apparatus according to claim 9, wherein the oxide layer and the nitride layer are formed by reactive sputtering or reactive vapor deposition.

11. The magnetic recording and reproducing apparatus according to claim 1, wherein the magnetic recording layer has an oxidized coating film at its surface.

12. The magnetic recording and reproducing apparatus according to claim 11, wherein the oxidized coating film is formed by oxidizing the surface of the magnetic recording layer composed of a metal or alloy comprising at least one member selected from the group consisting of iron, cobalt and nickel, by e.g. reactive plasma treatment.

13. The magnetic recording and reproducing apparatus according to claim 1, wherein the recording residual magnetization of the magnetic disk is composed essentially of a component perpendicular to the magnetic recording layer.

14. The magnetic recording and reproducing apparatus according to claim 1, wherein the recording residual magnetization of the magnetic disk is composed essentially of a component in the same plane as the magnetic recording layer.

* * * * *